US010578894B2

(12) United States Patent
Li

(10) Patent No.: US 10,578,894 B2
(45) Date of Patent: Mar. 3, 2020

(54) METHOD OF DESALINATING MURA AND DOT/LINE DEFECTS OF DISPLAY PANEL AND DISPLAY PANEL

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Qiang Li, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/753,834

(22) PCT Filed: Jan. 24, 2018

(86) PCT No.: PCT/CN2018/074013
§ 371 (c)(1),
(2) Date: Nov. 6, 2018

(87) PCT Pub. No.: WO2019/127788
PCT Pub. Date: Jul. 4, 2019

(65) Prior Publication Data
US 2019/0204629 A1    Jul. 4, 2019

(30) Foreign Application Priority Data
Dec. 29, 2017 (CN) .......................... 2017 1 1487374

(51) Int. Cl.
*G02F 1/13* (2006.01)
*G06T 7/00* (2017.01)
*G02F 1/13363* (2006.01)

(52) U.S. Cl.
CPC ........ *G02F 1/1309* (2013.01); *G02F 1/13363* (2013.01); *G06T 7/0004* (2013.01);
(Continued)

(58) Field of Classification Search
CPC combination set(s) only.
See application file for complete search history.

(56) References Cited

U.S. PATENT DOCUMENTS

2015/0187306 A1*  7/2015  Syu ...................... G09G 3/3655
                                                                345/87
2017/0242167 A1*  8/2017  Jia ........................... G02B 5/201

FOREIGN PATENT DOCUMENTS

CN          1629697       6/2005
CN          103761933     4/2014
(Continued)

*Primary Examiner* — Lauren Nguyen
(74) *Attorney, Agent, or Firm* — Hemisphere Law, PLLC; Zhigang Ma

(57) ABSTRACT

A method of desalinating mura and dot/line defects of a display panel is provided, including the following steps: S1: providing a display panel; S2: making the display panel display an alignment mark image; S3: accurately aligning an screen detector with the display panel; S4: photographing and recording the display panel to obtain a display image of the display panel; S5: extracting the display image and calculating a compensation image; S6: inputting the compensation image into a printer to generate a compensation film; S7: accurately attaching the compensating film on the display panel. Compared with the related art, in the method, by performing observation of lighting-on the display panel, recording the defect position, and printing the compensation film by thin film printing and precisely attaching the compensation film on the display panel, the display status is improved, and the problem of the mura and the dot/line defects is solved.

6 Claims, 4 Drawing Sheets

(52) U.S. Cl.
CPC ............... *G06T 2207/30121* (2013.01); *G06T 2207/30168* (2013.01)

(56) References Cited

FOREIGN PATENT DOCUMENTS

| | | |
|---|---|---|
| CN | 104934015 | 9/2015 |
| CN | 105845843 | 8/2016 |
| KR | 20170026975 | 3/2017 |

* cited by examiner

METHOD OF DESALINATING MURA AND DOT/LINE DEFECTS OF DISPLAY PANEL AND DISPLAY PANEL

RELATED APPLICATIONS

The present application is a National Phase of International Application Number PCT/CN2018/074013, filed Jan. 24, 2018, and claims the priority of China Application No. 201711487374.0, filed Dec. 29, 2017.

FIELD OF THE DISCLOSURE

The disclosure relates to the technical field of image quality distortion detection, and in particular to a method of desalinating mura and dot/line defects of a display panel and a display panel.

BACKGROUND

Display panel technology such as liquid crystal display (LCD) and organic light-emitting diode has developed rapidly in recent years and has become the mainstream display technology product currently on the market and has been widely used.

However, due to the influence of uncontrollable factors such as technical equipment and raw materials in the prior art, the influence of film thickness, critical defect (CD), residue, and the like in the manufacturing process may occur, and then the phenomena of various signs generated by uneven brightness and the poor phenomena such as dot/line defect caused by particle may exists during the lighting process of the display panel, and the mura and dot/line defects appear on the display panel will reduce the viewer's perception experience.

Therefore, it is necessary to provide a new method of desalinating the mura and dot/line defects of a display panel and a new display panel to solve the problem.

SUMMARY

The technical problem to be solved by the disclosure is to provide a method of desalinating mura and dot/line defects of a display panel, which can effectively solve the problem of the mura and the dot/line defects of the display panel.

To solve the technical problem, the disclosure provides a method of desalinating the mum and the dot/line defects of a display panel, including the following steps:

S1: providing a display panel having the mura and/or the dot/line defects;

S2: inputting a signal to the display panel to make the display panel display an alignment mark picture;

S3: accurately aligning a screen detector with the display panel;

S4: photographing and recording a mura check image and a dot/line defect check image displayed on the display panel by the screen detector to obtain a display image of the display panel;

S5: extracting the display image of the display panel by calculation simulation and calculating a compensation image;

S6: inputting the compensation image into a printer and performing thin film printing by the printer to generate a compensation film;

S7: accurately attaching the compensating film on the display panel.

Optionally, in the step S2, a signal is input to the display panel through a control personal computer (PC).

Optionally, in the step S3, the screen detector and the display panel are precisely aligned by the control PC.

Optionally, the screen detector includes a charge-coupled device (CCD) and takes a picture by the CCD.

Optionally, in the step S5, the display panel image is extracted by calculation simulation of the control PC.

Optionally, the display panel includes a top polarizer, a liquid crystal panel, a bottom polarizer, and a backlight unit sequentially stacked.

The disclosure further provides a display panel, including a compensation film, a top polarizer, a liquid crystal panel, a bottom polarizer, and a backlight unit sequentially stacked, and the compensation film is configured to desalinate the mura and the dot/line defects of the display panel.

Compared with the related art, in the method of desalinating the mura and the dot/line defects of a display panel provided by the disclosure, by performing observation of lighting-on the display panel, recording the defect position, printing the compensation film by thin film printing, and precisely attaching the compensation film on the display panel, the display status of the display panel is improved, and the problem of the mura and the dot/line defects of the display panel is solved.

DETAILED DESCRIPTION OF PREFERRED EMBODIMENTS

The technical solutions in the embodiments of the disclosure will be described clearly and completely below. Obviously, the described embodiments are only a part but not all embodiments of the disclosure. In view of the embodiments described herein, any other embodiment obtained by those of ordinary skill in the art skilled in this art without offering creative effort is included in a scope claimed by the disclosure.

Figure 1:
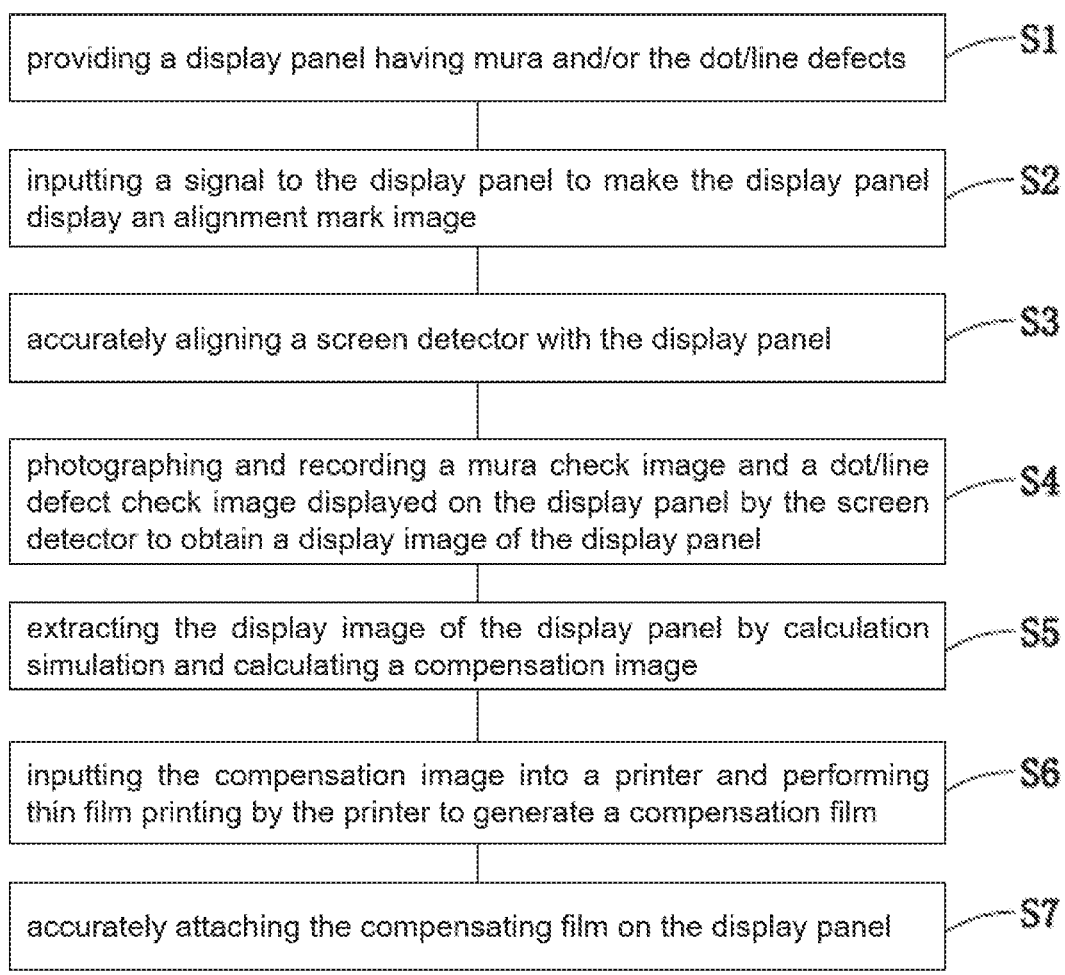
FIG. 1 is a flowchart of a method of desalinating mura and dot/line defects of a display panel according to an embodiment of the disclosure.

Referring to FIG. 1, FIG. 1 is a flowchart of a method of desalinating mura and dot/line defects of a display panel according to an embodiment of the disclosure. The disclosure provides a system 100 of desalinating mura and dot/line defects of a display panel, including a control PC 1, a screen detector 2, a display panel 3 to be detected, and a printer 4.

The control PC 1 is respectively connected to the screen detector 2, the display panel 3, and the printer 4. The control PC 1 may be a notebook computer, a desktop computer, or the like.

The screen detector 2 is configured to find the pixel defects, analyze subpixel brightness and color, and photograph and record the positions showing the mura and pixel defects. The screen detector 2 includes a supervisory computer control (SCC) having a photographing function.

The display panel 3 may be a non-good liquid crystal panel, configured to control the on-off of light, the brightness of light, and the generated color information. The display panel 3 includes a top polarizer 31, a liquid crystal panel 32, a bottom polarizer 33, and a backlight unit 34.

The printer 4 is configured to be controlled by the control PC 1 to print a compensation film on the printing material according to the detection result of the screen detector 2 on the display panel 3. The printer 4 may perform 255 grayscale printing on the printing material. By accurately attaching the printed compensation film on the display panel 3, the display status of the display panel can be effectively improved, and the problem of the mura and the dot/line defects of a display panel can be solved.

Figure 2:
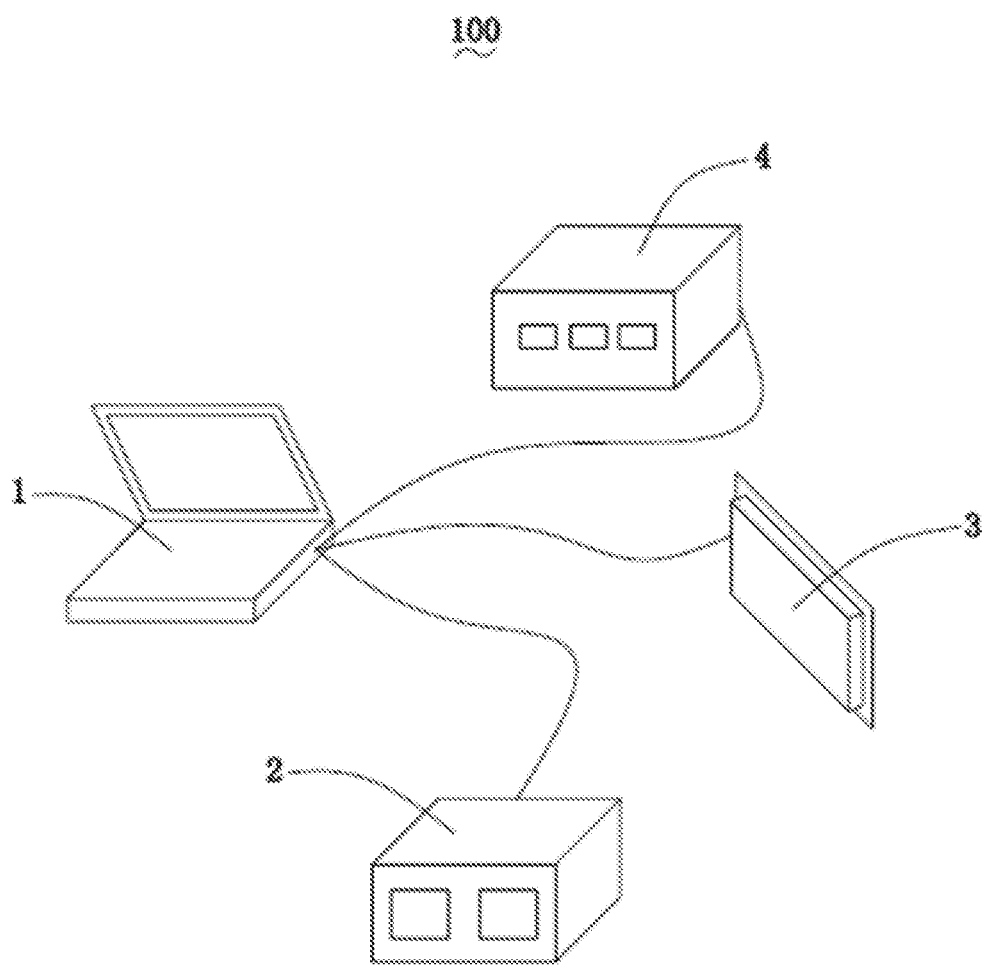
FIG. 2 is a schematic structural diagram of a display panel according to an embodiment of the disclosure.

Referring to FIG. 2, FIG. 2 is a schematic structural diagram of a display panel according to an embodiment of the disclosure. Based on the system 100 of desalinating the mura and the dot/line defects of a display panel, the disclosure further provides a method of desalinating the mura and the dot/line defect of a display panel, including the following steps:

S1: providing a display panel having the mura and/or the dot/line defects;

S2: inputting a signal to the display panel to make the display panel display an alignment mark picture;

Specifically, the control PC 1 inputs a signal to the display panel 3.

S3: accurately aligning a screen detector with the display panel;

Specifically, the screen detector 2 and the display panel 3 are precisely aligned by the control PC 1, S4: photographing and recording a mura check image and a dot/line detect check image displayed on the display panel 3 by the screen detector 2 to obtain a display image of the display panel 3;

S5: extracting the display image of the display panel 3 by calculation simulation and calculating a compensation image;

S6: inputting the compensation image into a printer and performing thin film printing by the printer 4 to generate a compensation film;

S7: accurately attaching the compensating film on the display panel.

Figure 3:
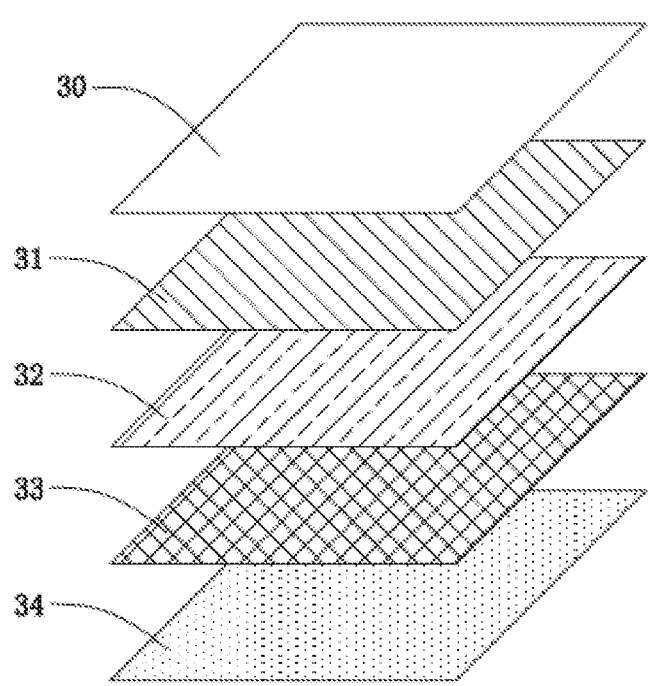
FIG. 3 is a structural diagram of a system of desalinating mura and dot/line detects of a display panel according to an embodiment of the disclosure.

According to the method of desalinating he mura and the dot/line defects of a display panel, the disclosure provides a display panel 3, which can solve the problem of the mura and the dot/line defects. The display panel 3 includes a compensation film 30, a top polarizer 31, a liquid crystal panel 32, a bottom polarizer 33, and a backlight unit 34 sequentially stacked, the compensation film 30 is configured to desalinate the mura and the dot/line detects of the display panel 3, specifically shown in FIG. 3, and FIG. 3 is a structural diagram of a system of desalinating the mura and the dot/line defects of a display panel according to an embodiment of the disclosure.

Figure 4:
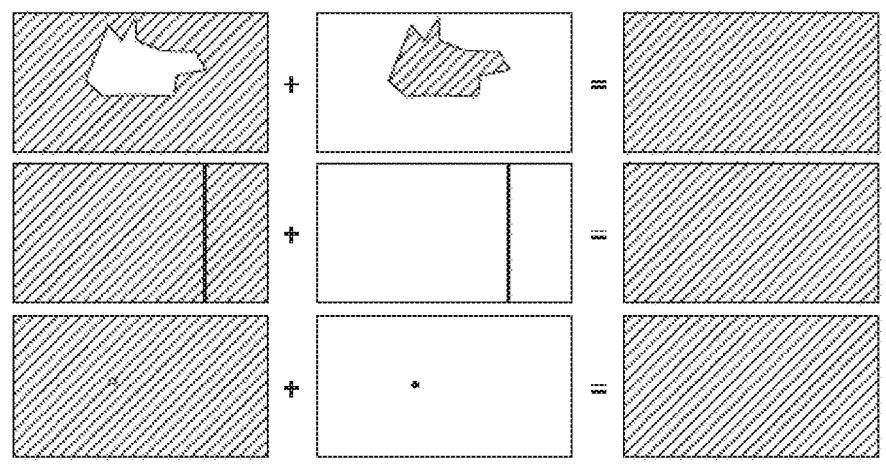
FIG. 4 is a schematic diagram of a status of a display panel before and after desalination according to an embodiment of the disclosure.

Referring to FIG. 4, FIG. 4 is a schematic diagram of a status of a display panel before and after desalination according to an embodiment of the disclosure. Specifically, as shown in the left figure of FIG. 4, when the mura defect, the line defect or the dot defect appear on the display panel 3 which is defective, the compensation film may be printed by the method of desalinating the mura and the dot/line defects of a display panel provided by the disclosure (Refer to the middle figure in FIG. 4), and accurately attaching the compensation film on the display panel which is defective (see the right figure in FIG. 4), then the problem of the mura and the dot/line defects can be solved.

Compared with the related art, in the method of desalinating the mura and the dot/line defects of a display panel provided by the disclosure, by performing observation of lighting-on the display panel, recording the detect position, printing the compensation film by thin film printing, and precisely attaching the compensation film on the display panel, the display status of the display panel is improved, and the problem of the mura and the dot/line defects of the display panel is solved.

Above are only embodiments of the disclosure is not patented and therefore limit the scope of the disclosure, the use of any content of the present specification and drawings made equivalent or equivalent structural transformation process, either directly or indirectly related to the use of other technologies areas are included in the same way the scope of the patent protection of the disclosure.

What is claimed is:

1. A method of desalinating mura and dot/line defects of a display panel, comprising the following steps:
    S1: providing a display panel having mura and/or the dot/line defects;
    S2: inputting a signal to the display panel to make the display panel display an alignment mark image;
    S3: accurately aligning a screen detector with the display panel;
    S4: photographing and recording a mura check image and a dot/line defect check image displayed on the display panel by the screen detector to obtain a display image of the display panel;
    S5: extracting the display image of the display panel by calculation simulation and calculating a compensation image;
    S6: inputting the compensation image into a printer and performing thin film printing by the printer to generate a compensation film;
    S7: accurately attaching the compensating film on the display panel.

2. The method of desalinating mura and dot/line defects of the display panel according to claim 1, wherein in the step S2, a signal is input to the display panel by a control PC.

3. The method of desalinating mura and dot/line defects of the display panel according to claim 2, wherein in the step S3, the screen detector and the display panel are precisely aligned by the control PC.

4. The method of desalinating mura and dot/line defects of the display panel according to claim 3, wherein the screen detector comprises a CCD and takes a picture by the CCD.

5. The method of desalinating mura and dot/line defects of the display panel according to claim 1, wherein in the step S5, the display panel image is extracted by calculation simulation of the control PC.

6. The method of desalinating mura and dot/line defects of the display panel according to claim 1, wherein the display panel comprises a top polarizer, a liquid crystal panel, a bottom polarizer, and a backlight unit sequentially stacked.

* * * * *